United States Patent Office 3,278,441
Patented Oct. 11, 1966

3,278,441
PROCESS FOR MAKING MAGNETIC METAL-CONTAINING POLYMER COMPOSITIONS
Thomas A. Manuel, Westfield, Martin Berger, East Brunswick, and Samuel B. Lippincott, Springfield, N.J., assignors to Esso Research and Engineering Company, a corporation of Delaware
No Drawing. Filed Dec. 20, 1963, Ser. No. 332,302
20 Claims. (Cl. 252—62.5)

This application is a continuation-in-part of Serial No. 201,260, filed June 11, 1962, now abandoned, which, in turn, is a continuation-in-part of Serial No. 176,131, filed February 27, 1962, now abandoned.

The present invention concerns metallic organic polymer compositions, their method of preparation and utility. In particular, the instant invention relates to metal carbonyl-containing polymers formed from unsaturated hydrocarbon polymers. More particularly, the invention concerns metal carbonyl polymers of carbon-to-carbon, ethylenically unsaturated, homopolymers and copolymers such as polybutadiene, styrene-butadiene copolymer, natural rubber, and the like. Even more particularly, the invention relates to the reaction of metal carbonyls with unsaturated polymers to obtain novel solids and liquids with magnetic properties.

The magnetic polymers of the invention can be used as solids or in liquid form. They have utility as rubber reinforcing agents, catalysts, for making low density magnetic materials, for magnetic tape coating compositions, as magnetically and electrically responsive fluids and solids, magnetic printing inks, paint compositions, magnetic clutch liquids, magnetic coatings, etc. The magnetic liquids of the invention will flow freely in the absence of a magnetic field, and if sufficient concentrations of the polymer are present, will become gelled or a rigid or a semisolid upon the application of a magnetic field, such as that induced by a surrounding coil in which an electric current flows. Upon removal of the magnetic field, the liquid will again be free flowing.

Using solutions of the magnetic material, thin films can be made in the normal manner. These films are attracted by a magnet. If these films are formed in the presence of a magnetic field, then the films are permanently magnetically oriented.

If one precipitates the metal-polymer in the normal manner, the resultant polymer is strongly attracted to a magnet. Similarly, if one precipitates it in the presence of a magnetic field, the polymer is magnetically oriented. This polymer can be molded in the usual manner.

Electron micrographs of said thin films indicate the metal, e.g., iron, exists as particles of approximately 100 A. in diameter. These particles, in turn, are attached to each other in long (about ½ to 1 micron) unbranched chains.

The magnetic liquid may also be used for closed pumping systems, nondestructive ferrometal testing, magnetic control of viscosity, novel "read-in" techniques for computers, and coatings for paper, wood, and metals. The film is also useful for random access memory devices, microelectronic components, resistant heating devices, and metal adhesives.

The bulk polymer will make excellent permanent magnet materials (due to anisotropicness of iron chains). Since this material appears to have low conductivity, it should make good transformer core material, motor armature material, and be generally useful for electromagnetic devices.

In S.N. 201,260 methods and techniques were shown for preparing polymers which, without further heat treatment, did not exhibit exceptional magnetic properties. In general, these polymers of S.N. 201,260 contained one metal carbonyl group per pair of conjugated double bonds in the resulting polymer.

In order to obtain materials with magnetic properties, the polymers had to be pyrolyzed at temperatures above 100° C. for periods of from 10 minutes to 12 or more hours.

The present invention relates to the discovery that by using an excess of the metal carbonyl in the metal polymer preparation and by extending the duration of the treatment past the time required to secure metal complex formation, magnetic polymers can be obtained directly. It is believed that particles of pure metal are attached to and grow from the metal carbonyl groups located at the double bonds. Furthermore, it has been additionally discovered that magnetic fluids having superior magnetic properties are obtained when the preparation of the magnetic fluid is carried out in the presence of a magnetic field greater than that of the earth. The field can be quite small. For instance, that exerted by a commercial laboratory magnetic stirring bar has been found to be sufficient.

A preferred method of providing a magnetic field is that of the solenoid electromagnet which is described in Example 6. However, any means of exerting a magnetic field can be used.

Thus in S.N. 201,260 the basic polymeric complex unit in the polymer was shown to be represented by the general formula

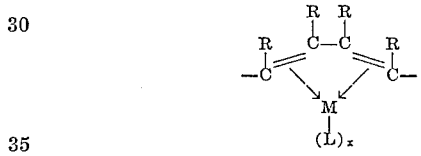

wherein M is a polyvalent heavy metal, particularly a transition metal such as iron, cobalt and nickel; R comprises a substituent group like hydrogen and hydrocarbons, particularly $C_1$ to $C_3$ alkyl groups and combinations thereof; L is an electron donating ligand group bonded directly to the metal atom such as carbonyls, hydrogen, hydrocarbons, and other ligand groups previously dicussed; x represents the number of ligand groups and, depending upon the metal and the number of eelctrons shared by the ligand groups with the metal, can be a number from 1 to 4, such as 1, 2, 3 or 4, usually 3.

The unsatisfied valence bonds of the polymeric complex unit $-R_4C_4ML_x-$ are satisfied by one or more of either other polymeric complex units as described, or by other ethylenically unsaturated or saturated hydrocarbon groups within the main or side chain, such as

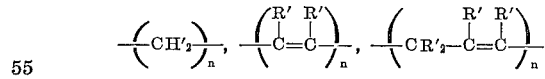

and the like wherein R' is a radical such as hydrogen and hydrocarbon radicals such as alkyl, aryl, alkylaryl, olefinic, cyclodiene radicals and n is a number from 1 to 10, e.g., 2 to 8. Suitable examples include methylene, vinylene and vinylidene radicals. The complex unit can be interspersed within the other groups of the polymer in any combination such as in isolated, cumulative or conjugated positions. Of course, the ends of the polymer main or side chains and also the complex unit where this unit is on the end of the chain are terminated with the usual terminal end groups such as $CR'_3-$, $CR'_2=CR'-$ and hydrogen. The exact amount and nature of the complex unit distribution within the polymers depends on the type of polymer, the degree of ethylenical unsaturation before and after the reaction, and other factors within the selection or control of the formulator skilled in the art.

In S.N. 201,260 it was disclosed that in the reaction between the polymer and the metal carbonyl compound, the isolated ethylenically unsaturated bonds are transposed to conjugate positions. For example, in the reaction between polybutadiene and iron carbonyl, the pair of remaining ethylenical bonds in two polymerized monomers is conjugated with the resulting structural formula of

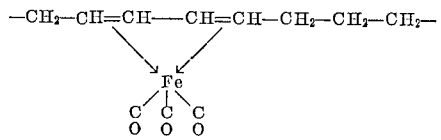

with the unsatisfied valences satisfied as before by the remaining portion of the polybutadiene structure such as by $C_4H_6$ groups or multiples thereof or by terminal groups such as $C_4H_7$ groups. The polybutadiene complex unit was also generally represented in S.N. 201,260 as

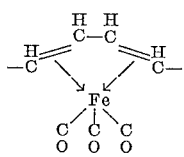

The method of the instant invention gives particles which, together with polymer, are associated into chains which may range up to four or five microns in length, or even longer. This phenomenon is possible only when the polymer contains complexed metal carbonyl groups. It is believed that the metal particles are held to the polymer chain through these groups. Iron carbonyl is the preferred carbonyl reactant. The basic polymeric complex unit in the polymers of the instant invention are represented by the formula

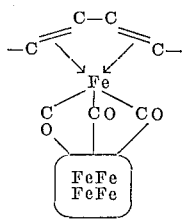

It can be seen that several additional Fe molecules form in a cluster on the internal iron carbonyl group. This is referred to herein as "clumping." The iron molecules are said to form "clumps." In the presence of a magnetic field, the iron particles and their associated polymer are formed into the chains observed. The presence of the chains imparts unusual magnetic properties. It is well known that elongated fine particles have superior magnetic properties (I. S. Jacobs and C. P. Bean, Physical Review, 100, 1060 (1955)). The chains of the invention are, in effect, such materials. Although the preferred compositions of the invention are the magnetic polymers having "clumps" of a metal, it will be understood that novel polymers having "clumps" of a metal can be prepared by omitting the magnetic field in their preparation. These polymers have a smaller degree of permanent magnetic character than do those prepared in the presence of a magnetic field and have utility as normal polymers where a large percent of metal content is desirable.

The magnetic liquids and solids of this invention can be prepared directly or from the metal carbonyl complexes of S.N. 201,260. It will be understood that, if prepared directly, the reaction will proceed via the reaction for the metal carbonyl complexes which is set forth in S.N. 201,260.

Generally, a solution of the metal complexed polymer in a solvent is heated at temperatures of from 100° to 300° C. for 12 to 120 hours in an inert atmosphere in the presence of excess metal carbonyl of the same or different metal as the carbonyl used to form the complex and in the presence of a magnetic field. The metal carbonyl can be added all at once or divided in several portions and added at intervals of several hours over the reaction time period. The resultant liquid contains a solution of the polymer and highly dispersed metal which is nonseparable under a strong magnetic field.

The solid, iron-containing polymer can be separated from the solvent and excess carbonyl by simple vacuum distillation at room temperature, which removes both solvent and excess carbonyl. The resulting solid polymers generally have iron contents ranging from 30 to 75 wt. percent of the total solid, although polymers containing a lesser amount of iron, of course, can be prepared.

The reaction conditions, solvents, reactants and the like set forth in S.N. 201,260 are, therefore, generally applicable and are set forth as follows.

In the art, hydrocarbon diene monomers have been reacted with iron carbonyls to give monomeric organometallic products. These products have limited utility due to the varying stability characteristics of these products. Further, from the structural formulas proposed, these products are incapable of polymerization without destruction of the metal-monomeric complex structure which structure depends upon the particular conjugate unsaturation of the monomers. For example, butadiene has been reacted with iron pentacarbonyl to give a product of the formula $C_4H_6Fe(CO)_3$, butadiene iron tricarbonyl.

Iron carbonyls and their derivatives have also been employed as a catalyst in catalytic amounts to accelerate polymerization and other reactions. For example, iron pentacarbonyl has been used in amounts of 10 weight percent or less with oily polybutadiene to accelerate further polymerization. The polymerization is normally carried out in oxidizing atmosphere or in the presence of oxidizing agents or conditions to produce viscous, gelled, or hard polymerization products of limited oil solubility and incapable of further polymerization or vulcanization reactions.

In said S.N. 201,260 it was disclosed that stable, high molecular weight, unsaturated metal carbonyl and polyatomic metal-containing polymers, could be prepared by the reaction between a metal carbonyl such as a Group VIII transition metal carbonyl compound of iron, cobalt and nickel, and carbon-to-carbon, ethylenically unsaturated hydrocarbon polymer or elastomer. These compositions are prepared by reacting relatively large quantities of metal carbonyl with the polymer in a nonoxidizing atmosphere to obtain oil-soluble, metal carbonyl polymer complexes. The metal carbonyl-containing elastomer complexes are vulcanizable either alone or with other elastomers at accelerated curing rates to form superior vulcanizates. Also, the metal carbonyl complexed rubbery polymers can be cured with curing agents which fail to cure or give poor cures to the uncomplexed rubbery polymers. Further, these metal complexed polymers exhibit exceptional heat stability and resistant qualities at very high temperatures. The same is true of the metal polymers of the invention which contain the additional metal "clumps."

Furthermore, heating of these complex polymers of S.N. 201,260 alone or in the vulcanization process at elevated temperatures, e.g. over 100° C., or in the presence of excess metal carbonyl, yields novel polyatomic metal, and polymetallic polyatomic-containing polymers exhibiting ferromagnetic properties. However, according to the present invention, polymers containing the best magnetic properties are those prepared with an excess of the carbonyl in the presence of a small magnetic field. Only the normal heating for the reaction is necessary. The magnetic field should be greater than that exerted by the earth and preferably from 2 to 10,000, preferably 10 to 1,000 and more preferably 50 to 500 oersteds for a period of about ten minutes, preferably about an hour or more.

The magnetic field can be either stationary or moving. Moreover, the magnetic field need not be applied continuously during the reaction. It can be applied at any time during the reaction for a time period less than the reaction time. The preferable time of application is toward the end of the reaction. It can also be applied during the entire reaction period without detriment.

The metal carbonyl polymer complexes of S.N. 201,260 are prepared by contacting the ethylenically unsaturated polymer either in bulk or in solution with the desired metal carbonyl compound in a nonoxidizing atmosphere or under nonoxidizing conditions. The quantity of the metal carbonyl to be employed depends in part upon the degree of unsaturation of the polymer and the desired amount of metal to be complexed with the polymer together with the desired characteristics and the proposed utility of the complexed polymers produced. The maximum quantity of metal carbonyl that can be complexed with the polymer can be determined stoichiometrically by the degree of polymer unsaturation, since each pair of carbon-to-carbon ethylenically unsaturated bonds is capable of complexing one mole of metal. Of course, the reaction can be carried out in situ during the polymerization, copolymerization, or the dehydrogenation of a polymer or its monomers; and the reaction can be carried out with less than stoichiometric quantity of the metal carbonyl, where a high metal content is undesirable or not required. Regardless of the quantity of metal carbonyl employed, subsequent vulcanization or curing of the metal carbonyl complexed polymer can be accomplished, whether there exist complex, conjugated, unsaturated bonds or free, unsaturated bonds in the polymer.

In S.N. 201,260 it was disclosed that concentration of the metal carbonyl should generally exceed 10 wt. percent or catalytic quantities since these lower amounts are normally ineffective to form sufficient metal complexed polymer for most requirements. Of course, the exact concentration of the metal carbonyl will vary, subject to selection, but the preferred amount of metal carbonyl for the present invention based on the weight of the monomeric polymer unit or copolymer unit in the polymer should be a major amount of 50 weight percent or more, with from 100 to 800, e.g., 150 to 500, weight percent or even higher concentrations often required in the reaction. The weight percent of metal carbonyl used will depend on the degree of unsaturation of the polymer and the molecular weight of the polymer. These concentration limits for the complex of S.N. 201,260 may be generally expressed as at least 0.15 or from 0.25 to 2.50, e.g. 0.40 to 1.5 moles of metal carbonyl per mole of ethylenical unsaturation in the polymer for preparation of the complex S.N. 201,260. The quantity of the metal carbonyl and metal complexed with the polymer is usually determined by analysis of the infrared spectra of polymer samples or by conventional combustion analysis methods. For preparation of the magnetic materials of this invention the carbonyl is used in large excess. For instance, from 9 to 200, preferably 40 to 150, and most preferably about 85 to 115 parts by weight of metal carbonyl per part of polymer can be used.

These concentrations for the reaction can be expressed as 2 to 55, preferably 2.51 to 55, more preferably 11 to 41, and most preferably 23 to 32 moles of metal carbonyl per mole of ethylenic unsaturation. This is a total amount and, if the intermediate produce, i.e., the complex of S.N. 201,260 has already been prepared, then the amount of metal carbonyl found in the complex should be taken into account. It is almost a negligible amount compared with the excess carbonyl that must be reacted with it to form the "clump" type polymers.

In general, the reaction between the metal carbonyl and the copolymer to form the complex polymer or between the metal carbonyl and the complex polymer proceeds over a wide range of temperatures, preferably about 30° to 150° C., but efficient reaction rates require elevated temperatures of over 70° C. with temperatures of 80° to 130° C., generally preferred. For iron carbonyl, the temperature is preferably from about 100° to 150° C. For cobalt carbonyl or nickel carbonyl, temperatures of 20° C. to 90° C. are satisfactory.

The reaction proceeds at lower temperatures without significant degradation in the molecular weight of the polymer. But as the reaction temperature increases, the depolymerization of the polymer increases.

The reaction may be carried out at elevated temperatures with the polymer in bulk or in solution, e.g., in hydrocarbon solvents, where degradation of the polymer is of significant importance. Where maintenance of the polymer molecular weight is desired, the reaction is preferably carried out in solvent solutions of, or containing, polar protective solvents.

The time for the completion of the complexing reaction depends upon the reaction temperature selected, the metal carbonyl employed, the amounts of reactants, and other preselected reaction conditions. The time may vary from one hour to 72 hours, e.g., 2 to 24 hours. However, at the preferred elevated temperatures of above 70° C., the reaction normally is complete in 2 to 6 hours. For the magnetic polymer reaction the time is from 15 to 120 hours, preferably 24 to 96, and most preferably about 60 to 80 hours.

It will be noted that the ranges for time and quantity of carbonyl for the complex polymer and the magnetic polymer overlap to some extent. However, at the same temperatures of preparation the time of formation of the complex polymer is in orders of magnitude less than the time required for the "clumped" strongly magnetic and mildly magnetic polymers of this invention. The overlap of the carbonyl reactant is only in the 2 to 2.5 moles of carbonyl per mole of ethylenic unsaturation in the polymers.

To prevent polymerization and gelation of the polymer during the reaction, a nonoxidizing atmosphrere and condition is maintained in the reaction vessel. Gelation is usually prevented by employing a blanket of an inert gas such as nitrogen, helium, carbon monoxide, rare gases, and the like over the polymer after the reaction zone or vessel has been swept clear of air or oxidizing compounds and gases. The reaction proceeds at atmospheric pressures but pressures of from 0.1 to 10 atmospheres or higher or lower may optionally be used.

In one embodiment of the invention, a protective polar organic solvent is employed either alone or with a hydrocarbon polymer solvent to protect the polymer from molecular weight degradation at elevated temperatures. In this manner, rapid reaction rates without significant molecular weight degradation can be obtained. Any polar solvent having more polarity than a hydrocarbon, such as heptane, and other than an acid, acid anhydride or acid chloride, may be employed with those saturated organic solvents containing carbon, hydrogen and oxygen or containing one or more keto, ether, or hydroxyl groups being preferred protective solvents.

It has been found that, in general, the presence or absence of the polar protective solvent determines the relative coercivity of the resulting magnetic polymer. Thus, omission of the polar protective solvent generally results in polymers with a relatively low value of magnetic coercivity while the presence of the polar protective solvent generally results in magnetic polymers having a relatively high degree of coercivity. For some unknown reason, there are from time to time exceptions to the above general discussion on coercivity. Some magnetic polymers prepared in the absence of polar solvents but having high coercivity values have been obtained.

The term "coercivity" as used herein refers approximately to the degree of residual magnetism of the magnetic polymers. High coercivity indicates a relatively high degree of residual magnetism after a magnetic field has been removed. Low coercivity denotes a low degree of residual magnetism after a magnetic field has been removed. There are many uses where low coercivity is desired and, conversely, there are many other uses where high coercivity is equally desirable.

The protective solvent employed should be wholly, or partially miscible with the unsaturated polymer or the polymer solution and may, in certain cases, function as both the polymer solvent and the protective solvent, such as in the case of ethers like 1,3-dialkoxy alkanes such as 1,3-dimethoxy ethane. Dioxane (1,4-diethylene dioxide) is a particular preferred protective solvent.

The protective solvent when employed in combination with a hydrocarbon solvent normally comprises from 1 to 30 volume percent of solution, e.g., 1 to 10 volume percent. Suitable nonlimiting examples of polar solvents include those substituted and unsubstituted, saturated and unsaturated, $C_1$ to $C_{30}$ aliphatic, alicyclic, aromatic, heterocyclic and alkyl-aromatic solvents such as cyclohexanol; alkanols like methanol, ethanol, tert butanol; alkyl aromatic alcohols like benzyl alcohol; glycols like propylene glycol, hexylene glycol; ketones like acetone, cyclohexanone; ether like alkyl and armoatic ethers such as ethyl ether, phenyl ether; aldehydes like benzaldehyde, acetaldehyde; esters like carboxylic esters such as benzyl acetate, tert butyl acetate and the like, and mixtures and combinations thereof.

The process of preparing the intermediate polymeric complexes of S.N. 201,260 and metal-containing polymers of the present invention may be aided, if desired, by the employment of high energy and actinic sources to wholly or partially replace the use of heat. Thus, gamma irradiation or ultraviolet irradiation, e.g., in the range of 1850 to 5500 Angstroms may be used alone or in combination to effect the reaction of the metal carbonyl and the polymer. Further, the metal carbonyl, besides being added directly to the polymer as a liquid or solid, can be employed in the gaseous form either as a gas or sublimate vapor. In this situation, any liquid-gas or solid-gas contacting means can be employed such as a sparger beneath the surface of the polymer solution, or column contacting means whereby a stream of metal carbonyl gases is employed in a current or countercurrent direction to the polymer or polymer-containing solution.

A preferred embodiment of the invention comprises adding the unsaturated polymer to a solution comprising a hydrocarbon solvent and, in some instances, a polar solvent and, optionally, other conventional additives, sweeping the reaction vessel with nitrogen to remove air, adding the metal carbonyl to the polymer solution, heating the solution to 70° C. to 130° C. while subjecting it to a magnetic field of 10 or more oersteds for about 72 hours. The resulting magnetic liquid can be used as is or a magnetic polymer can be recovered by precipitating the polymer in a polar precipitation nonsolvent for the polymer, such as an alcohol, ketone and the like, for example, an aliphatic alcohol.

The starting polymers employed are those homo or copolymers containing some degree of carbon-to-carbon ethylenical unsaturation. The unsaturation may be either in the main chain of the polymers such as present in head-to-tail polymerization methods, and as characterized by natural and synthetic elastomers like butyl rubber, or in the side chains of the polymer such as present in 1,2-polymerization as characterized by vinyl polybutadiene and 3,4-addition in polyisoprene. The ethylenically unsaturated bonds can also be present in both the main and the side polymer chains.

The degree of unsaturation of the polymers may vary between 0.5 to 99.5 mole percent such as between 0.5 and 50 mole percent, e.g., 1 to 30 or 1 to 10 mole percent, for those low unsaturated polymers and between 50 and 99 mole percent, e.g., 50 to 85 or 60 to 80 mole percent, for those highly unsaturated polymers.

The unsaturated linkages in the polymer can be conjugated, isolated, or cumulative, or any mixture or combination of these structural arrangements. The polymers prior to the complexing reaction can be partially vulcanized with conventional curing agents or copolymerized with other polymerizable monomers or polymers provided only that at the time of reaction with the metal carbonyl compound there remains some degree of carbon-to-carbon, ethylenical unsaturation within the polymer chain or molecule.

The polymers within the scope of the instant discovery may be broadly characterized as those ethylenically unsaturated polymers having an average molecular weight of from 1,000 to 3,000,000, preferably 100,000 to 800,000, most preferably 100,000 to 300,000, or higher or lower, and having Wijs iodine numbers of from 1 to 600, e.g. 1 to 50, for the low unsaturation polymers and over 100, e.g., 200 to 400, for the highly unsaturated polymers. All molecular weights are viscosity-average unless otherwise indicated.

Particularly suitable polymers and elastomers include those ethylenically unsaturated hydrocarbon rubbery polymers capable of cross linking or vulcanization and being elastic in character. Nonlimiting examples of unsaturated polymers suitable for the purposes of the invention include:

(1) Copolymers containing a major amount of an isoolefin and a minor amount of a multiolefin. These copolymers are commonly known as "butyl rubber" with their preparation and uses being described in U.S. Patent 2,356,128 to Thomas et al. This rubber normally comprises from about 85 to 99.5 weight percent of a $C_4$ to $C_8$ isoolefin such as isobutylene, or a $C_1$ to $C_3$ alkyl substituent like 2-methyl-1-butene, and from 0.5 to 15.0 weight percent of a $C_4$ to $C_{14}$ multiolefin or preferably a $C_4$ to $C_6$ multiolefin such as dimethylallyl, a cyclic diene like cyclopentadiene and cyclohexadiene, or more preferably a conjugated diene like isoprene, 1,3-butadiene, or a hydrocarbon substituted, e.g., an alkyl substituted, conjugated diene like dimethyl butadiene and the like. The rubbery reaction product of isobutylene and isoprene is particularly preferred. These butyl rubber polymers described commonly have Wijs iodine numbers of from 1 to 50 and from 0.5 to 10.0 mole percent unsaturation.

(2) Copolymers of a diene and a vinyl aromatic generally known as GR–S or SBR type rubbers commonly made by copolymerizing from 30 to 80 weight percent of a $C_4$ to $C_8$ conjugated diene such as butadiene, isoprene, or a cyclic diene such as cyclopentadiene or cyclohexadiene and a hydrocarbon substituted, e.g., an alkyl substituted, diene such as dimethyl butadiene with from 70 to 20 weight percent of a vinyl aromatic such as styrene, dimethyl styrene and alkyl substituted vinyl aromatics like divinyl benzene and the like, the preferred copolymer being that reaction product of about 70 to 80 weight percent of butadiene with about 20 to 30 weight percent of styrene.

(3) Polydienes such as those hydrocarbon polymers prepared by the homopolymerization of conjugated dienes like butadiene, isoprene, cyclic dienes like cyclopentadiene and their hydrocarbons and particularly $C_1$ to $C_3$ alkyl substituted dienes.

(4) Copolymers prepared by copolymerizing major amounts of from 50 to 98 weight percent, e.g., 60 to 80 weight percent, of a $C_4$ to $C_8$ cyclic or straight chain diene such as butadiene, isoprene, cyclopentadiene, hexadiene and the like with minor amounts of from 2 to 40 weight percent of a $C_2$ to $C_6$ monoolefin like ethylene, propylene, diisobutylene, isobutylene, pentene and the like.

(5) Natural rubber and natural rubber latexes such as those natural elastomeric products derived from the latex of the Hevea and Ficus species. These products are characterized by a high level of unsaturation, rubbery like characteristics and commonly have Wijs iodine numbers of above 200, such as from 200 to 400 or even higher.

These copolymers and homopolymers described above may be copolymerized further with minor amounts, such as from 1 to 30 weight percent, of organic polymerizable monomers or other polymerizable polymers containing one or more vinyl, vinylene, or vinylidene groups such as vinyl aromatics like styrene, divinyl benzene; vinyl cyanides like acrylonitrile, ethacrylonitrile; vinyl esters like the vinyl esters of short chain fatty acids, e.g., vinyl acetate, long chain fatty alcohol esters of acrylic acid and $C_1$ to $C_3$ alkyl substituted acrylic acid; halogenated vinyl compounds like vinylidene chloride, vinyl chloride, chloroprene, ethylene dichloride and the like.

The polymer types described above with the exception of the butyl rubber are commonly referred to as high unsaturation polymers having at least 30 mole percent of unsaturation such as from 50 to 99 mole percent unsaturation.

Unsaturated polymers and particularly those polymers described above can be reacted with the desired metal carbonyl either in bulk or in solution. In order to assure a rapid reaction rate and intimate contact of the metal carbonyl with the polymer by mixing or agitation during the course of the reaction, it is preferred that the polymer be dissolved in an inert organic solvent. Those polymers having molecular weights of below 50,000 normally have viscosity low enough to permit the bulk polymer to be used. Those polymers of higher molecular weight and especially those above 100,000 usually require solvation to obtain suitable handling and mixing characteristics. These polymers may then be used in solvents at varying proportions, while very high molecular weight polymers such as above 200,000 are commonly employed in solutions of not more than 20 weight or 10 weight percent such as from 1 to 6 weight percent.

It is preferred that very low concentrations of polymer in solvent be used, that is, less than 1 gram/100 ml. of solvent. A preferred range is 1/16 to 1/2 weight percent of polymer. Satisfactory magnetic polymers of the invention have been prepared using starting polymer concentrations as low as 0.005 gram/100 ml. of solvent.

Suitable solvents to be employed in effecting solvation include, but are not limited to, dioxane, aliphatic and aromatic hydrocarbons like benzene, toluene, xylene, hexane, heptane, petroleum naphtha, cyclohexane, and the like, ethers such as tetrahydrofuran, 1,2-dimethoxyethane, bis(2-methoxyethyl) ether and the like; ketones like acetone, acetylacetone, methylethyl ketone, methylisobutyl ketone, cyclohexanone and the like; carbon disulfide and mixtures thereof.

This invention is applicable to any unsaturated polymers or elastomers regardless of the method of polymerization employed to obtain the original starting polymer. Thus, the instant process can be profitably employed with those unsaturated polymers normally prepared by the use of heavy metal-organo metal catalysts such as aluminum alkyl-titanium halide systems, for example, the aluminum-triethyl-titanium tetrahalide system referred to as Ziegler catalysts or with metal salt complex systems, as well as with alkali metal catalysts like alkyl-lithium or lithium metal catalysts or with a Friedel-Crafts catalyst like aluminum chloride, boron trifluoride and the like, as well as with those polymers commonly prepared by organic or inorganic free radical initiators or anionic or cationic emulsion polymerization techniques or any other methods.

Many such processes are described in Preparative Methods of Polymer Chemistry, by W. Sorenson and T. W. Campbell, Interscience Publishers, N.Y. (1961), while many of the polymers such as butyl rubber and GR–S are described in greater detail in Synthetic Rubber by G. S. Whitby, J. Wiley & Sons, Inc., N.Y. (1954).

The metal carbonyls suitable for the purposes of this invention include carbonyls of Cr, Mo, Mn, Fe, Co, Ni, Ru, Rh, Os, Ir, especially carbonyls of polyvalent heavy metals and particularly those Group VIII transition metal carbonyls of iron, cobalt and nickel and their substituted derivatives, and combinations and mixtures thereof. Of particular preference are iron carbonyl compounds due to their availability, relatively low cost, stability and low toxicity characteristics. The metal carbonyl employed can be in monomeric or polymeric form, substituted or unsubstituted, with those stable unsubstituted carbonyls and hydrocarbon substituted carbonyls, especially those containing at least two replaceable carbonyl groups, being of particular significance.

The metal carbonyls can contact the unsaturated polymer in any desired physical form such as a liquid, as with $Fe(CO)_5$; as a gas or sublimate vapor, as with $Fe(CO)_5$; or as a solid, as with $Fe_3(CO)_{12}$ and $Fe_2(CO)_9$; or any combinations thereof. Many carbonyls sublimate, and therefore these carbonyls may initially contact the polymer as a solid and subsequently, depending upon the reaction conditions, sublimate to a vapor during the course of the reaction.

It is preferred that the intermediate metal complex polymer be prepared from iron carbonyl. Other carbonyls in excess can be then added so that an iron carbonyl is at the unsaturated site and other metals such as listed above are "clumped" in groups on the iron carbonyl.

Nonlimiting examples of suitable metal carbonyl compounds include those monomeric, dimeric, trimeric and tetrameric carbonyls having from 4 to 12 carbonyl groups, e.g., 4 to 8 carbonyl groups, wherein the carbonyl groups are bonded directly to the metal such as those unsubstituted metal carbonyls like iron pentacarbonyl, di-iron nonacarbonyl, tri-iron dodecacarbonyl, dicobalt octacarbonyl, tetracobalt dodecacarbonyl, nickel tetracarbonyl and the like.

Suitable substituted metal carbonyls include those carbonyls having one or more substituent groups or electron donating ligands bonded to the metal atom of the carbonyl compound such as hydrocarbon groups like unsaturated hydrocarbons like butadiene, 1,3-octadiene, acetylene, propylene, alicyclic conjugated dienes like cyclopentadiene, cyclooctatetraene, $C_1$ to $C_3$ alkyl substituted cyclopentadiene and the like. Nonlimiting examples of substituted carbonyls include 1,3-butadiene-iron tricarbonyl, cyclooctatetraene-iron tricarbonyl, cyclopentadienyl cobalt dicarbonyl, dicyclopentadieneyl di-iron tetracarbonyl, acetylene dicobalt hexacarbonyl and the like, and combinations thereof.

A further class of suitable carbonyl compounds includes the neutral and anionic metal carbonyl hydrides wherein one, two, three, four or more hydrogens, as well as carbon monoxide, are bonded directly to the metal, or a combination of hydrocarbons, carbon monoxide and other ligand substituents are bonded directly to the metal as well as the hydrogen. Suitable transition metal carbonyls include the neutral cobalt tetracarbonyl monohydride $HCo(CO)_4$, the neutral iron tetracarbonyl dihydride $H_2Fe(CO)_4$, the anionic bis iron octacarbonyl monohydride $[HFe_2(CO)_8]^-$, the anionic tris iron undecane carbonyl monohydride $[HFe_3(CO)_{11}]^-$, the anionic iron tetracarbonyl monohydride and the like. Also suitable for the purposes of this invention are the neutral salts of the anionic metal carbonyl hydrides. Suitable basic or neutralizing reagents for reaction with the anionic metal carbonyl hydrides include the alkali, alkaline earth and heavy metal oxides and hydroxides, ammonia, amines, such as fatty acid amines, alkyl amines like ethyl amine, polyamines like alkylene diamines, hydroxy amines, quaternary ammonium hydroxides and the like. An example of a suitable neutral salt formed by the reaction of an alkyl amine with the anionic metal hydride carbonyl would be $[C_2H_5NH]^+[HFe_3(CO)_{11}]$.

Other nonlimiting examples of mixed metal hydrocarbon hydrides include, for example, cyclopentadienyl iron dicarbonyl hydride, butadiene cobalt carbonyl hydride. Other suitable ligands include phosphines like triphenyl phosphine, arisines, amines, halides, isonitriles, cyanides and the like.

The invention is further illustrated by the following examples:

Example 1

In this example, ten grams of cis-1,4 polybutadiene having a viscosity-average molecular weight of about 200,000 were dissolved in 500 cc. of xylene and 50 cc. of dioxane. Thirty cubic centimeters of iron pentacarbonyl were added to this solution; and after four hours reflux at about 135° C., another 30 cc. increment was added, followed by a third increment of 30 cc. in an additional four hours. There are 7½ millimoles per milliliter of iron carbonyl. The solution was then refluxed for an additional 48 hours after the addition of the third increment. During the entire duration of this experiment, the reaction mixture was stirred by a magnetic stirrer producing a field at its surface of about 400 oersteds. On cooling the solution, it was found that the black liquid was strongly attracted by, and responsive to, a magnetic field created by an electrical coil. Measurement of the highly dispersed iron particles showed that about 90% of the particles were smaller than 80 Angstroms, with 50% smaller than 30 Angstroms.

Example 2

In this example, 0.75 g. of cis-1,4 polybutadiene having a viscosity-average molecular weight of about 200,000 was dissolved in 300 ml. of xylene and 15 ml. of dioxane. Forty milliliters of iron pentacarbonyl were added to the solution and the mixture was stirred with a magnetic stirrer having a field at its surface of about 300 oersteds while being heated in an oil bath kept at 125° C. After 90 hours, the mixture was cooled and examined. It showed a coercivity of 240 oersteds at a field of 1000 gauss and a value of $B_{remanence}/B_{saturation}$ of 0.50.

Example 3

In this example two runs were made simultaneously and under identical conditions except that one was run in the magnetic field of about 100 oersteds produced by two C-shaped permanent magnets while the other was run without a magnetic field except that of the earth. The reactions were carried out in 500 ml. round bottom flasks with oil baths. The magnets were placed in one of the baths, the poles just touching the flask at or slightly below the level of the liquid in the flask. The flasks were equipped with air driven mechanical stirrers, reflux condensers and thermometers. The reactions were run under a blanket of nitrogen.

The charge to each flask consisted of 1.75 g. of cis-1,4 polybutadiene having a molecular weight of about 200,000 dissolved in 160 ml. of xylene, 15 ml. of dioxane and 15 ml. of iron pentacarbonyl. The oil baths were maintained at about 140° C. which gave a steady reflux, the reaction temperature being 120–122° C. After five hours, another 15 ml. portion of iron carbonyl was added to each, the reaction temperature dropping to 116–117° C. After refluxing overnight (16 hours) a third portion (20 ml.) of iron carbonyl was added which lowered the reflux temperature to 115° C. Refluxing was continued for another 5½ hours.

The reaction mixtures were then cooled to room temperature and transferred to bottles. When the bottles were brought near a strong permanent magnet it was found that one, the one that had been prepared in the magnetic field, was strongly attracted. The other was also attracted but to a much lesser extent. In addition, the solution prepared in the magnetic field showed a high degree of orientation (light microscope) at relatively low field strengths, while the solution prepared in the absence of a magnetic field showed almost no orientation even under high field conditions. Most important, electron microscope examination showed that the field-prepared solution has a characteristic chainlike structure and it is these chains which are orienting in the magnetic field. The other solution showed almost no chainlike structure in the electron microscope.

Example 4

In this example a solution consisting of 1.75 grams of cis-1,4 polybutadiene, having a viscosity average molecular weight of 200,000, 160 ml. of xylene, 15 ml. of dioxane, and 15 ml. of $Fe(CO)_5$ was heated for 8 hours at refluxing temperature. This was done in a nitrogen atmosphere. At this time, 15 ml. of $Fe(CO)_5$ were again added. The solution was allowed to reflux for an additional 16 hours. At that time, 20 ml. of $Fe(CO)_5$ were added. The reaction was then stopped after 6 additional hours. The mixture was stirred continuously during the course of the reaction with a magnetic stirrer having a surface field intensity of 500 oersteds. The reaction mixture was black in color and had *no* suspended materials. Centrifuging did not separate out any material. Hence, it was concluded that the polybutadiene-iron composition was soluble in the xylene. Under the conditions described above, a solution having 10 to 15% by weight of iron was obtained.

This solution responds to a magnetic field. Thus, it can be made to "run uphill." It must be emphasized that the magnetic field does *not* pull the iron out of solution; the entire solution responds to the field.

Example 5

A solution of 0.75 g. of styrene-butadiene rubber having a viscosity average molecular weight of about 300,000 in 150 ml. of xylene was mixed with 36 g. of iron pentacarbonyl in a standard 4-neck 500 ml. flask equipped with reflux condenser, nitrogen inlet, thermometer, and mechanical stirrer. The flask was placed in an oil bath kept at 130° C. (the flask) directly over and touching a one-inch Teflon-coated Alnico magnetic of the type frequently used for stirring reactions which generated an average magnetic field of 3 oersteds within the flask. The mixture was stirred mechanically under a nitrogen atmosphere for 64 hours, then cooled and decanted. This yielded a homogeneous black liquid which had a coercive force below 120 at 1000 gauss.

Example 6

A solution of 1.0 g. of cis-1,4 polybutadiene having a viscosity-average molecular weight of 200,000 in 400 ml. of xylene was mixed with 80 ml. (117 g.) of iron pentacarbonyl and 20 ml. of dioxane in a cylindrical glass vessel fitting inside a solenoid electromagnet. The reactor was fitted with thermometer, reflux condenser, and an electrically driven mechanical stirrer. A current of 0.52 amp was passed through the coil, generating a field of 300 gauss throughout the reactor. The mixture was stirred slowly and heated at 119° under a nitrogen atmosphere by a heating mantle. A sample withdrawn after 20 hours showed a coercive force of 200 at 1000 gauss and a ratio of $B_{remanence}/B_{maximum}$ of 0.6; after 44 hours these values were 240 and 0.7, respectively.

Example 7

A solution of 0.11 g. of natural rubber in 175 ml. of xylene was mixed with 30 ml. (34 g.) of iron pentacarbonyl in a flask fitted with a mechanical stirrer and reflux condenser. A magnetic stirring bar was placed beneath the flask, giving an average field of 5 oersteds within the flask. The mixture was stirred and heated under nitrogen with an internal temperature of 118° for 44 hours, then cooled and decanted. The product was a homogeneous black liquid with a coercive force of 260 oersteds and a ratio of $B_{remanence}/B_{maximum}$ of greater than 0.7.

The following example demonstrates that magnetic polymers containing mixtures, i.e. cobalt and iron, of different metals can be prepared.

Example 8

A solution of 2.4 g. of iron carbonyl complexed polymer containing 30 mole percent of $C_8H_{12}Fe(CO)_3$ units, prepared from 1.75 g. of cis-1,4 polybutadiene as described in S.N. 201,260, in 80 ml. of benzene was mixed with 60 ml. of xylene containing 6 g. of $Co_2(CO)_8$ in a flask fitted with reflux condenser and nitrogen inlet. The mixture was stirred by a magnetic stirring bar with a field at its surface of 300 gauss and heated at 91–92° for 22 hours. The product was a black liquid, strongly attracted by a magnet. Electron microscope pictures showed the presence of chainlike aggregates of tiny particles, just as are seen in the case of iron.

Although the invention has been described with a certain degree of particularity, it will be understood that minor modifications and changes can be made therein without departing from the spirit of the invention as hereinafter claimed.

What is claimed is:

1. A method of preparing a metal-containing magnetic polymer which comprises reacting ethylenically unsaturated hydrocarbon polymer with a metal carbonyl compound, said metal carbonyl compound being present in the reaction in a concentration of at least 2.00 moles of metal carbonyl per mole of ethylenical unsaturation in the polymer and wherein at least a portion of said reaction is carried out within a magnetic field having an average force of at least 2 oersteds.

2. A method according to claim 1 wherein the polymer is selected from the group consisting of a polydiene, natural rubber, a vinyl aromatic-aliphatic diene copolymer, a $C_4$ to $C_8$ isoolefin-$C_4$ diolefin copolymer.

3. A method according to claim 1 wherein said metal is a Group VIII transition metal.

4. A method according to claim 1 wherein in said reaction between about 2.51 to 55 moles of metal carbonyl are used in the reaction per mole of ethylenical unsaturation in the polymer.

5. A method according to claim 1 wherein said reaction is carried out at temperatures of from about 30° to 150° C.

6. A method according to claim 1 wherein said metal is iron.

7. A method according to claim 1 wherein about 0.15 to 2.5 moles of iron carbonyl and 2.05 to 55 moles of other metal carbonyl per mole of ethylenic unsaturation are contacted with said polymer during the course of said reaction.

8. A method according to claim 1 wherein the reaction is carried out in the presence of hydrocarbon solvent and a polar solvent.

9. A method according to claim 1 wherein the reaction is carried out in the presence of a hydrocarbon solvent but in the absence of a polar solvent.

10. A method of preparing an iron-containing polymer composition which comprises reacting under nonoxidizing conditions at a temperature of from 30° to 150° C. an ethylenically unsaturated hydrocarbon polymer solution with an iron carbonyl compound, for a time of about 4 to 120 hours, the iron carbonyl compound being present in the reaction at a concentration between about 2.51 to 55 moles of iron carbonyl per mole of ethylenical unsaturation in the polymer, wherein said reaction is carried out in the presence of an organic solvent for said polymer.

11. A method according to claim 10 wherein said reaction is carried out in the absence of a polar solvent.

12. A method according to claim 10 wherein from 9 to 200 parts of metal carbonyl are contacted with every part by weight of polymer during the course of the reaction.

13. A method according to claim 10 wherein said iron carbonyl compound consists of iron and carbonyl groups.

14. A method according to claim 10 wherein the polymer is selected from the group consisting of polybutadiene, natural rubber, butadiene-styrene copolymers and butyl rubber.

15. A method according to claim 10 wherein the solvent of the said polymer solution comprises a mixture of hydrocarbon solvents and sufficient miscible nonacid oxygen-containing polar solvent to prevent undesired degradation of the molecular weight of the polymer.

16. A method of preparing a metal-containing polymer which comprises reacting an ethylenically unsaturated hydrocarbon polymer with 2.51 to 55 moles of metal carbonyl per mole of ethylenical unsaturation in said polymer over a period of 15 to 90 hours at a temperature of from 30 to 150° C.

17. The method of claim 16 wherein said metal is a Group VIII transition metal and wherein at least a portion of the reaction takes place in a magnetic field of at least about 2 oersteds.

18. The method of claim 17 wherein the reaction is carried out in the absence of a polar solvent containing oxygen.

19. The method of claim 16 wherein the total amount of metal carbonyl is divided into at least two equal portions, said portions being added to the reaction at intervals of at least 2 hours over the entire period of the reaction.

20. A method of preparing a metal-containing polymer which comprises reacting an ethylenically unsaturated hydrocarbon polymer with a metal carbonyl compound wherein during the course of said reaction about 9 to 200 parts of metal carbonyl are contacted with every part by weight of polymer, said polymer being in a hydrocarbon solvent at a proportion of less than about one gram of polymer per 100 cc. of solvent.

References Cited by the Examiner
UNITED STATES PATENTS

| | | | |
|---|---|---|---|
| 2,409,167 | 10/1946 | Veltman | 260—439 |
| 2,849,312 | 8/1958 | Peterman. | |
| 2,974,104 | 3/1961 | Paine et al. | |
| 3,014,818 | 12/1961 | Campbell | 252—513 |
| 3,117,092 | 1/1964 | Parker. | |

References Cited by the Applicant
UNITED STATES PATENTS

| | | |
|---|---|---|
| 1,891,203 | 12/1932 | Ambros et al. |

TOBIAS E. LEVOW, *Primary Examiner.*

MAURICE A. BRINDISI, R. D. EDMONDS, *Examiners.*